Patented Apr. 12, 1949

2,466,675

UNITED STATES PATENT OFFICE 2,466,675

PRODUCTION OF SULFONATED RESIN ION EXCHANGE AGENTS IN STABLE GRANULAR FORM

William C. Bauman, Midland, Mich., assignor to The Dow Chemical Company, Midland, Mich., a corporation of Delaware No Drawing. Application April 2, 1945,
Serial No. 586,271

7 Claims. (Cl. 260—49)

This invention concerns the production of sulphonated resins of high cation-absorptive capacity in the form of stable granules of considerable size, i. e. of size such as to permit ready and rapid flow of liquids through a bed of the same. The invention is particularly concerned with the conditioning of granules of the substantially dry sulphonated resins so as to reduce or avoid shattering, crumbling, or spalling of the granules when wetted with water.

A number of water-insoluble sulphonated resins suitable for use in water-softening or other ion exchange operations are well known. Examples of such exchange agents are the resinous condensation product of formaldehyde and phenol sulphonic acid, materials obtained by sulphonating the resinous condensation products of formaldehyde with phenol or other monohydric or polyhydric phenols, the sulphonated resinous copolymers of monovinyl- and polyvinylaromatic compounds such as of styrene and divinylbenzene, of nuclear methylated styrene and divinylbenzene, of chlorostyrene and divinylbenzene, of styrene, ethyl vinylbenzene and divinylbenzene, etc.

In general the sulphonated synthetic resins are either obtained directly in substantially anhydrous form, e. g. by the reaction of a sulphonating agent such as concentrated sulphuric acid, fuming sulphuric acid, or chlorosulphonic acid on a pre-formed resin such as the styrene and divinylbenzene copolymer, or in the case of resins formed by reacting a sulphonated phenol with an aqueous formaldehyde solution, the resinous product, which occludes sulphuric acid formed in the reaction, is dried, usually to a point at which it retains less than 15 per cent by weight of water, prior to use as a cation exchange agent. Such preliminary drying is of importance, since it improves the properties of the resinous product, presumably by causing more extensive cross-linking between the resin molecules.

In any instance, the substantially dry sulphonated resin, i. e. of less than 15 per cent water-content, may be ground, cut, or otherwise obtained in the form of granules of any desired size. However, upon contact of the granules with water they tend to crumble or undergo spalling and in many instances are reduced to a fine powder or to the form of fine flakes by such action. In this connection, it may be mentioned that the tendency toward crumbling or spalling of the granules becomes more pronounced and extensive with increase in the degree to which the resin has been sulphonated (i. e. with increase in the cation absorptive capacity of the resin) and also with increase in the initial particle size of the dry sulphonated resin. Crumbling and spalling are particularly pronounced in the instance in which the substantially dry sulphonated resin is in the form of particles incapable of passing a 30 mesh per inch screen and is one which, after being wetted with water, has a cation absorptive capacity corresponding to more than 20,000 grains of calcium carbonate per cubic foot of the bed of granular resin. The extensive occurrence of crumbling or spalling renders the resin poorly suited for use as a cation exchange agent, since the finer resin particles tend to be carried from the bed by liquors flowing through the same or tend to cause plugging and the development of a back-pressure when a screen is used to prevent such loss of the resin.

Presumably because of difficulties such as those just mentioned, the sulphonated resin type of cation exchange agents are usually marketed in the form of products which consist for the most part of particles of smaller than 30 mesh size or which have cation absorptive capacities of less than 20,000 grains of calcium carbonate per cubic foot of the resin bed, even though there is need for such exchange agents of higher cation absorptive capacity and of larger particle size. Employment of the agents in the form of particles of greater than 30 mesh size is advantageous in that it permits rapid passage of liquor through a bed of the resin without the development of an excessively high back-pressure and without excessive loss of the resin due to entrainment in the liquor. In most instances it is desirable that an exchange agent have a high ion absorptive capacity, since the productive capacity of a given ion exchange unit is dependent in part upon the absorptive capacity of the exchange agent employed.

It is an object of this invention to provide a method whereby sulphonated resins having cation absorptive capacities of greater than 20,000 grains of calcium carbonate per cubic foot of the wet resin bed may be obtained in the form of relatively stable granules of greater than 30 mesh size suitable for direct use in ion exchange operations. A particular object is to provide a method of conditioning granules of the sulphonated resins so as to reduce, or prevent, crumbling or spalling of the same during subsequent use in ion exchange operations. Other objects will be apparent from the following description of the invention.

I have found that the shattering, which granules of the nearly dry sulphonated resins undergo upon direct immersion in fresh water, may be rendered far less extensive, e. g. so as to amount merely to a slight spalling, or may be entirely avoided by first soaking the granules with an aqueous solution containing from 5 to 40 per cent of an ionizable inorganic compound other than ammonium hydroxide, which inorganic compound does not react with sulphuric acid to form a water-insoluble sulphate. The solutions employed may be neutral, acidic, or basic. The treatment may be accomplished by immersion in, or by spraying with, such a solution.

The solutions of the concentrations just stated have relatively little or no effect in causing crumbling or spalling of the granules, but they do cause at least a slight and gradual swelling of the granular material so as to bring it to a swollen condition approaching that which it will have when immersed in fresh water without causing the development of internal strains such as to cause shattering. The effectiveness of the aqueous solutions in pre-conditioning the resins without themselves causing shattering of the resin granules increases with increase in the concentration of cations in the solutions. Apparently it is because of the well-known low concentration of cations in ammonium hydroxide that it, of itself, is not suitable for use as a conditioning agent. The presence of ammonium hydroxide in aqueous solutions of other ionizable inorganic compounds, e. g. sodium chloride or ammonium chloride, etc., does not impair the utility of the solutions as conditioning agents.

It is important that the solution in which the granular resin is soaked be of a concentration within the above stated limits, but it may, if desired, be brought, e. g. by dilution with fresh water, from a more concentrated condition to a concentration within said limits while in contact with the resin. Direct transfer of the granules from an acid or salt solution of greater than 40 per cent concentration into contact with fresh water often causes shattering to an objectionable extent, particularly when the granules are of larger than 30 mesh size. Direct treatment of the nearly dry granular resin of greater than 30 mesh particle size with solution of an inorganic compound in less than 5 per cent concentration usually also causes extensive cracking or spalling of the granules.

As hereinbefore mentioned, the tendency toward occurrence of cracking or spalling of the sulphonated resins increases with increase in size of the granules of the resin. Thus, in order to avoid entirely the occurrence of spalling during the pre-conditioning operation, the concentration of the ionizable inorganic compound in the solution selected for use in the treatment may vary from the minimum value of 5 per cent to a concentration of 18 per cent or higher with increase in the particle size of granular resin from about 30 mesh to about 10 mesh. When the solution with which the resin is soaked is of considerably greater than 5 per cent concentration, e. g. of 10 per cent concentration or higher, its concentration may advantageously be decreased to below 10 per cent, e. g. by gradual dilution with water, while it is in contact with the granular resin. Such gradual dilution of the solution which is in contact with the granular resin permits further expansion of the granules to occur gradually so as to reduce the possibility of the granules becoming fractured. Once the concentration of the solution in contact with the resin granules of 30 mesh size or larger has been reduced to 5 per cent or below, the resin may be immersed directly in fresh water without occurrence of spalling.

It is also important, when using a salt solution as the agent for conditioning the resin, that the salt be one which does not react with the sulphuric acid which normally is occluded in the freshly prepared sulphonated resin. An insoluble sulphate, if formed, tends at least temporarily to plug the pores of the resin and to reduce its efficiency as an ion exchange agent. Thus, aqueous solutions containing an appreciable amount of a calcium, barium, or strontium compound are unsuitable for use as conditioning agents.

As hereinbefore indicated, the invention is of particular advantage when applied in pre-conditioning granular sulphonated resins which are composed for the most part of granules of larger than 30, e. g. of from 5 to 20, mesh size and which have cation absorptive values corresponding to more than 20,000 grains of calcium carbonate per cubic foot of the wet resin bed. However, the invention may also be applied in stabilizing granular sulphonated resins of lower absorptive capacities or of smaller particle sizes.

In practice, a granular sulphonated resin which contains less than 15 per cent by weight of water is immersed in an aqueous solution containing between 5 and 40 per cent by weight of a dissolved ionizable inorganic compound which is incapable of reacting with sulphuric acid to form a water-insoluble sulphate. Examples of inorganic compounds which may be employed as the solutes in the aqueous solutions are phosphoric acid, sulphuric acid, hydrochloric acid, hydrobromic acid, sodium chloride, sodium sulphate, potassium chloride, potassium bromide, lithium chloride, ammonium chloride, ammonium sulphate, magensium chloride, magnesium sulphate, sodium carbonate, potassium carbonate, sodium hydroxide, or potassium hydroxide, or a mixture of two or more of such compounds, etc. The solution is preferably of a concentration such as to avoid any spalling of resin granules of the size desired in the treated product. For instance, when the body is made up of sulphonated resin granules of sizes ranging from 10 mesh to 30 mesh and smaller, direct immersion in a solution of 5 per cent concentration does not result in cracking of the granules of approximately 20 mesh size or smaller, but it may cause a moderate spalling of the larger granules. On the other hand, the employment of a solution of 20 per cent concentration or higher does not result in an appreciable spalling of any of the granules.

During immersion in the solution of an ionizable inorganic compound, the granules swell slightly and the granular bed expands somewhat. When the expansion is substantially complete, the granular material may, if desired, be separated from the solution and be washed with, or immersed in, fresh water. However, when the solution with which the resin is first treated is of a concentration considerably greater than 5 per cent, e. g. when it is of 10 per cent concentration or higher its concentration may advantageously be reduced to about 5 per cent or lower by the gradual or step-wise addition of water, or by replacing the solution with one of lower concentration, before removing the granular resin and contacting it with fresh water.

The pre-treatment with an acid or salt solution, as just described, conditions the granular resin so that it will withstand contact with fresh water, or with the acid, base, or salt solutions ordinarily employed in cation exchange operations, without undergoing further cracking or spalling of the granules. By maintaining the treated granules in a humid atmosphere or preferably moistened with water, e. g. during storage or shipment, they remain in a condition suitable for direct use in ion exchange operations.

The following examples describe certain ways in which the principle of the invention has been applied, but are not to be construed as limiting the invention.

EXAMPLE 1

The purpose of this example is to illustrate the effects of the sizes of granules of a sulphonated resin and of the concentrations of a salt in aqueous solutions thereof on the tendency toward shattering or spalling of the resin granules upon immersion in the solutions. The sulphonated resin which was employed in the tests was a condensation product of formaldehyde and phenolsulphonic acid which had been pulverized and screened to obtain batches thereof which were of substantially uniform particle size. Samples of each batch of the resin were immersed in aqueous sodium chloride solutions of varying concentrations in order to determine the concentration of salt solution below which spalling of the resin granules was observable and above which spalling did not occur. The following table gives the particle size of the resin employed in each test and the minimum concentration of the salt solution in which no spalling of the resin granules could be detected.

Table I

| Test No. | Particle Mesh Size | NaCl Concentration, Per Cent by Weight |
| --- | --- | --- |
| 1 | 50–60 | 1 |
| 2 | 40–50 | 3 |
| 3 | 35–40 | 5 |
| 4 | 30–35 | 8 |
| 5 | 15–20 | 21 |
| 6 | 10–15 | 26 |

The above values for the concentrations of the salt solutions are those at which no spalling whatever of the resin granules could be observed. In all instances little, if any, spalling or shattering of the granules occurred upon immersion of the same in a 10 per cent solution of sodium chloride and, although spalling was in some instances appreciable upon immersion of the granules of 30 mesh size and greater in a salt solution of 5 per cent concentration, the amount of spalling was, in each instance, far less than occurred upon direct immersion of the granules in fresh water. Direct immersion of unconditioned samples of any of the several batches in fresh water resulted in shattering of the granules.

EXAMPLE 2

The purpose of this example is to illustrate the effect of solutions of other ionizable inorganic compounds on sulphonated resin granules which were immersed in the same. The resin employed in these tests was a condensation product of formaldehyde and phenolsulphonic acid which was in the form of spherical particles of approximately 0.08 inch diameter, i. e. about 10 mesh particle size. Solutions of hydrochloric acid, sulphuric acid, potassium chloride, ammonium chloride, magnesium sulphate and sodium hydroxide were employed in the tests. It was found that no shattering or spalling of the granules occurred when they were immersed in a potassium chloride solution of at least 16 per cent concentration, in an ammonium chloride solution of at least 18 per cent concentration, in a hydrochloric acid solution of at least 18 per cent concentration, in a sulphuric acid solution of at least 25 per cent concentration, in a magnesium sulphate solution of at least 22 per cent concentration, or in a sodium hydroxide solution of 20 per cent concentration. Spalling was observable, but not extensive, when the granules were immersed in the solutions of 10 per cent concentration. Spalling occurred to a considerable extent when the granules were immersed in solutions of 5 per cent concentration, but the amount of spalling was less extensive than the shattering which occurred when the granules were immersed directly in fresh water.

EXAMPLE 3

A mass of a resinous sulphonated phenol-formaldehyde condensation product, which had been prepared by reacting 150 grams of phenol with 240 grams of concentrated sulphuric acid and treating the resultant mixture with 202 grams of an aqueous formaldehyde solution of 26.7 per cent concentration, was ground to particles of from 12 to 16 mesh size and dried. The moisture content of the dried material was less than 15 per cent by weight. After drying, the granular material was divided into two batches, one of which was washed directly with distilled water. Fifty grams of the other batch was immersed in 200 cubic centimeters of an aqueous sodium chloride solution of approximately 26 per cent concentration and the mixture was stirred for 10 minutes. Water was then added, with continued stirring, in three successive 100 cubic centimeter portions at intervals of 4 minutes between the additions. Three hundred cubic centimeters of the aqueous solution was removed by decantation, after which another three 100 cubic centimeter portions of water were added at 4 minute intervals while stirring the mixture. Another 300 cubic centimeters of the solution in contact with the resin was withdrawn and, after an interval of 4 minutes from the time when the last portion of water had been added, a further 250 cubic centimeter portion of fresh water was added. After continued stirring of the resultant mixture for from 2 to 4 minutes, the liquid was drained from the resin and the latter was washed with distilled water. The separate batches of granular resin which had been treated in the respective ways just described were screened to determine the distribution therein of resin particles of various sizes. The following table identifies each batch of granular resin by indicating whether it was treated directly with distilled water or was first treated with the sodium chloride solution. The table gives the particle size distribution in each batch by giving the per cent of the total volume of the treated resin which was composed of particles of the mesh sizes indicated.

Table II

| Particle Size | Per Cent of Particles of Each Size in Batch When Latter Was— | |
| --- | --- | --- |
|  | Treated Directly With Distilled H$_2$O | First Treated With NaCl Solution |
| Larger than 16 mesh | 2.2 | 86.0 |
| 16–20 mesh | 8.7 | 10.0 |
| 20–30 mesh | 49.6 | 2.0 |
| 30–40 mesh | 19.3 | 1.0 |
| 40–50 mesh | 11.5 | 0.7 |
| 50–60 mesh | 5.6 | 0.3 |
| Smaller than 60 mesh | 3.1 | None |

Of the batch which had been treated directly with distilled water, 39.5 per cent by volume was in the form of particles of smaller than 30 mesh size and 89.1 per cent was of smaller than 20 mesh particle size. In contrast, only 2 per cent of the batch which had first been treated with the sodium chloride solution was of smaller than 30 mesh particle size and 4 per cent was of smaller than 20 mesh particle size.

EXAMPLE 4

A sulphonated phenol-formaldehyde resin, obtained by the reaction of 10.75 pounds of phenolsulphonic acid with 7.5 pounds of an aqueous formaldehyde solution of 24.7 per cent concentration, was prepared in the form of smooth rounded granules which were dried by heating at 160° C. for 1.5 hours. By sampling and screening it was found that approximately 60.5 per cent of the product was in the form of granules of from 20 to 30 mesh size. The dried granular material was divided into three batches. One batch was immersed directly in fresh water and, after allowing the mixture to stand for about five minutes, samples of the resin were withdrawn and examined under the microscope. It was found that the granules had been shattered by the treatment with water and that in most instances they were shattered into many much smaller fragments. Another batch of the dried granular resin was immersed in an aqueous sodium chloride solution of approximately 26 per cent concentration for ten minutes. The solution was then decanted from the resin and the latter was washed with fresh water. Microscopic examination of the washed resin showed that cracking of the granules had occurred, but that it was far less extensive than in the first test. A 5 cubic centimeter portion of the third batch of dried resin was immersed for 10 minutes in 50 cubic centimeters of sodium chloride solution of 26 per cent concentration, after which water was added with stirring at a rate of 7 cubic centimeters per minute over a period of one hour. The rate of water addition was then increased to 20 cubic centimeters per minute and water was added at the last-mentioned rate for a period of one hour. The resin was then separated by decantation and was washed thoroughly with fresh water. Microscopic examination of the treated resin showed that no shattering, cracking or spalling of the granules had occurred.

EXAMPLE 5

A body of spherical particles of a copolymer of 74 parts by weight styrene, 18 parts ethyl vinylbenzene and 8 parts divinylbenzene was sulphonated by heating the same together with concentrated sulphuric acid and thereafter draining off the excess of acid. One portion of the sulphonated copolymer was immersed directly in distilled water, whereupon a crackling sound was heard which continued for one or two minutes. Subsequent microscopic examination of the resin showed that the granules had been shattered. Another portion of the granular sulphonated resin was immersed for one-half hour in an aqueous sodium chloride solution of 26 per cent concentration. The solution was then drained away from the resin and the latter was immersed for one-half hour in an aqueous sodium chloride solution of 3.5 per cent concentration. This solution was removed by decantation and the resin was washed with fresh water. Samples of the resin were then examined under the microscope. No shattering, cracking, or spalling of the granules could be detected. By screening it was found that approximately 65 per cent by volume of the product consisted of granules of from 20 to 30 mesh size.

Other modes of applying the principle of the invention may be employed instead of those explained, change being made as regards the method herein disclosed, provided the step or steps stated by any of the following claims or the equivalent of such stated step or steps be employed.

I therefore particularly point out and distinctly claim as my invention:

1. In a method for conditioning a sulphonated resin of the class consisting of sulfonated phenolformaldehyde resins and sulfonated copolymers of monovinyl aromatic hydrocarbons and polyvinyl aromatic hydrocarbons, which sulfonated resin is substantially insoluble in water, is free of ionizable radicals other than the sulphonate radical, contains less than 15 per cent by weight of water, is in the form of a granular body composed for the most part of granules of larger than 30 mesh size and which possesses a cation absorptive value corresponding to more than 20,000 grains of calcium carbonate per cubic foot of the granular resin, so that the granular resin may be brought into contact with fresh water without undergoing extensive shattering of the granules, the steps which consist in soaking the granular resin in an aqueous solution containing more than 18 per cent by weight of a dissolved ionizable inorganic compound other than ammonium hydroxide, which inorganic compound is incapable of reacting with sulphuric acid to form a water-insoluble sulphate, and while maintaining the granular resin in contact with said solution gradually diluting the latter with water until it is of less than 10 per cent concentration.

2. The method as described in claim 1 wherein the sulphonated resin is a sulphonated phenol-formaldehyde condensation product.

3. The method as described in claim 1, wherein the sulphonated resin is a sulphonated phenol-formaldehyde condensation product and the aqueous solution with which it is contacted is a solution of an alkali metal salt.

4. The method as described in claim 1 wherein the sulphonated resin is a sulphonated phenol-formaldehyde condensation product and the aqueous solution with which it is treated is a sodium chloride solution.

5. The method as described in claim 1 wherein the sulphonated resin is a sulphonated copolymer of monovinyl- and polyvinyl-aromatic compounds.

6. The method as described in claim 1 wherein the sulphonated resin is a sulphonated copolymer of styrene, ethylvinyl benzene and divinyl benzene.

7. The method as described in claim 1 wherein the sulphonated resin is a sulphonated copolymer of styrene, ethyl-vinylbenzene and divinylbenzene and the aqueous solution with which it is treated is a sodium chloride solution.

WILLIAM C. BAUMAN.

REFERENCES CITED

The following references are of record in the file of this patent:

UNITED STATES PATENTS

| Number | Name | Date |
|---|---|---|
| 2,195,196 | Wassenegger et al. | Mar. 26, 1940 |
| 2,372,233 | Thurston | Mar. 27, 1945 |
| 2,392,435 | Tyler | Jan. 8, 1946 |

OTHER REFERENCES

Myers et al., Ind. Eng. Chem., Sept. 1941, pages 1203–1212.